United States Patent [19]
Knapp

[11] 4,190,356
[45] Feb. 26, 1980

[54] PHOTOGRAPHIC EASEL APPARATUS
[76] Inventor: Paul A. Knapp, 1303 W. 9th St., Tempe, Ariz. 85282
[21] Appl. No.: 911,381
[22] Filed: Jun. 1, 1978
[51] Int. Cl.² .................. G03B 27/58; G03B 27/44
[52] U.S. Cl. .................................. 355/74; 355/54
[58] Field of Search ............................... 355/74, 54
[56] References Cited
U.S. PATENT DOCUMENTS

| | | | |
|---|---|---|---|
| 2,895,377 | 7/1959 | Manning | 355/54 |
| 3,230,823 | 1/1966 | Krassopoulos | 355/54 |
| 4,095,892 | 6/1978 | Thornton | 355/74 |
| 4,108,548 | 8/1978 | Hawkins | 355/74 |

*Primary Examiner*—Richard A. Wintercorn
*Attorney, Agent, or Firm*—H. Gordon Shields

[57] ABSTRACT

A photographic easel includes a plurality of panels movable separately and independently of each other for exposing sequential portions of photographic material disposed on the easel.

13 Claims, 8 Drawing Figures

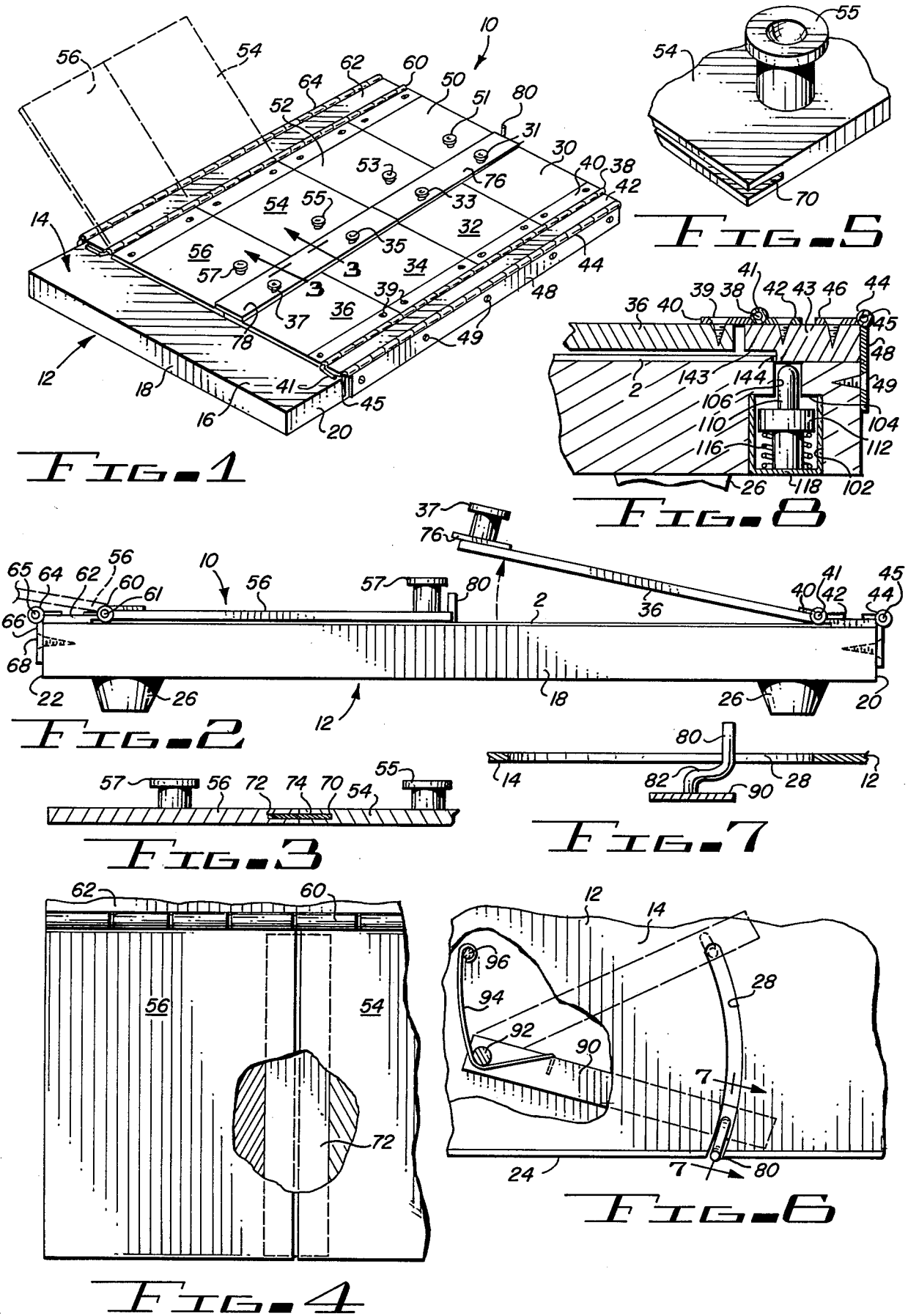

PHOTOGRAPHIC EASEL APPARATUS

BACKGROUND OF THE INVENTION

1. Field of the Invention

This invention relates to photographic apparatus and, more particularly, to photographic easel apparatus for holding a large sheet of photographic paper for sequential exposure of various portions of the paper while protecting other portions from exposure.

2. Description of the Prior Art

Positive photographs can be made in a variety of sizes, depending on the specific requirements of the particular picture. Photographic material, such as positive paper, is typically purchased in large sheets which may be divided into several smaller portions for pictures of various sizes, as desired or required. For holding a large sheet of photographic material, it is necessary to cover the material while positioning and focusing are accomplished. Then, after the material has been positioned and the enlarger focused, it is necessary to cover a portion of the material while another portion is exposed. Obviously, some light is required during the positioning and focusing steps, and it is accordingly necessary to have the entire material covered. The exposure of only a desired portion of the material then becomes a problem because the balance of the paper or material must be carefully protected from exposure in order to preserve its integrity and to avoid exposure which ruins the paper.

The alternative to buying a large sheet of photographic paper and of putting several individual pictures on a large sheet is to simply buy smaller paper of the specific size desired. The disadvantages are the price and inconvenience of working with several small sheets and of having to portion the chemicals to suit the size of print desired. With respect to the latter, chemicals are normally packaged for processing a large sheet. The apparatus of the present invention accordingly presents an alternative to the prior art by providing an easel for holding photographic paper and for allowing the photographic paper to be selectively exposed in different areas and for different sized areas.

SUMMARY OF THE INVENTION

The photographic easel apparatus described and claimed herein comprises a base plate for holding a sheet of photographic material and a plurality of movable panels which may be selectively and consecutively opened and closed for exposing and protecting portions of the material.

Among the objects of the present invention are the following:

To provide new and useful photographic easel apparatus;

To provide new and useful apparatus for holding a sheet of photographic material;

To provide new and useful apparatus for selectively exposing portions of a sheet of photographic paper;

To provide new and useful apparatus for protecting portions of a sheet of material while allowing other portions of the material to be exposed; and To provide new and useful photographic easel apparatus for protecting and exposing portions of photographic paper substantially simultaneously.

BRIEF DESCRIPTION OF THE DRAWING

FIG. 1 is a perspective view of apparatus of the present invention.

FIG. 2 is an end view of the apparatus of FIG. 1.

FIG. 3 is a view in partial section of the apparatus of FIG. 1 taken generally along line 3—3 of FIG. 1.

FIG. 4 is a top view of a portion of the apparatus of FIG. 1.

FIG. 5 is an enlarged perspective view of a portion of the apparatus of FIG. 1.

FIG. 6 is an enlarged top view of a portion of the apparatus of FIG. 1.

FIG. 7 is a view in partial section of a portion of the apparatus of FIG. 6 taken generally along line 7—7 of FIG. 6.

FIG. 8 is an enlarged view in partial section of a portion of the apparatus of FIG. 1.

DESCRIPTION OF THE PREFERRED EMBODIMENT

FIG. 1 is a perspective view of a photographic easel 10 embodying the present invention. The easel comprises a base 12, which is preferably of a rectangular configuration, and with a generally flat, planar top 14. Four edges extend substantially perpendicular to each other and to the top 14, including a rear edge or side 18, and a right side 20, both of which are shown in FIG. 1. A left side 22 is shown in FIG. 2, and a front edge or side 24 is shown in FIG. 6.

Eight discrete panels are shown pivotally secured to the top 14 of the base 18 in FIG. 1. The panels are substantially identical to each other and are aligned in two columns of four panels each. The panels are secured to piano hinges at the sides of the base to enable the panels to be pivoted upwardly and away from the top of the base, as desired. On the right side of the apparatus 10 are four panels, identified by reference numerals 30, 32, 34, and 36. Each of the panels includes a knob for pivoting the panels, and the knobs are respectively designated by reference numerals 31, 33, 35, and 37. Between the rear edge or side 18 and the eight panels is a focusing plane 16. The focusing plane 16 comprises the rear portion of the top 14.

Referring briefly to FIGS. 2 and 8, the details of the hinges and panels are shown. The panels are disposed adjacent each other and are in turn secured to one leaf 40 of a piano hinge 38 by a plurality of appropriate fasteners, such as screws 39, as best shown in FIG. 8. A pin 41 extends throughout the length of the hinge 38.

A spacer or plate 43 is secured to a second leaf 42 of the hinge 38 on the opposite side of hinge 38 from the panels 30, 32, 34, and 36. The spacer or plate 43 extends the full length of the hinge 38, which length is substantially the cumulative length of the panels 30 . . . 36.

One leaf 46 of a second piano hinge 44 is also secured to the plate 42 by appropriate fasteners, such as the screws 39. The hinge 44 is also secured to the base 12. A second leaf 48 of the hinge 44 is secured to the side 20 of the base 12 by a plurality of appropriate fasteners, such as screws 49. The leaves of the hinge 44 are secured together by a pin 45, which is substantially identical to the pin 41.

On the left side of the photographic easel apparatus 10 are four panels substantially identical to panels 30 . . . 36. The panels on the left side are designated respectively by reference numerals 50, 52, 54, and 56. Each panel includes a knob secured to the panel for pivoting the panel. The knobs for the panels are respectively designated 51, 53, 55, and 57. The panels 50 . . . 56 are secured to one leaf of a hinge 60 by appropriate fasteners, such as screws, as illustrated in conjunction with the panels 30 . . . 36. The other leaf of the hinge 60 is secured by appropriate fasteners to a spacer or plate 62. A second hinge 64 is also secured to the spacer or plate 62 and to the side 22 of the base 12, as shown in FIG. 2. The hinges, hinge pins, and fasteners are substantially identical to the hinges and other elements discussed above.

The hinge 60 is secured to the spacer or plate 62 which is disposed between the second hinge 64 and the first hinge 61. The hinge 64 is also secured to a side panel 66 by an appropriate hinge pin 65, as best shown in FIG. 2. The plate 66 is secured to the left side 22 of the base 18 by appropriate fastening means, such as screw 68.

In FIG. 1, panels 54 and 56 are shown in phantom pivoted away from the top 14 of the base 12, in what may be referred to as an open position. The open position allows exposure of the paper beneath the panels 54 and 56.

Rearwardly of the panels on the base is the focusing plane 16. The focusing plane comprises the rear portion of the top 14. The focusing plane is used for focusing purposes since it is closer to the actual height of the photographic material or paper disposed on the top 14 beneath the panels than is the plane of the tops of the panels themselves. Accordingly, more accurate focusing may be accomplished using the focusing plane 16 than by using the tops of the panels.

A protective strip 76 is secured to the panels 30 and 32 to cover the center juncture between the double panels 30, 32 and 50, 52. The protective strip is used primarily for making five-by-seven pictures. In addition to a protective strip to cover the center juncture, protective strips are also required at the junctures of two sets of adjacent panels, such as panels 30 and 32 and panels 50 and 52. The panels 30 and 32 and the panels 50 and 52 are joined together at their junctures as shown in FIGS. 3, 4, and 5, and as discussed in detail below. The strip 76 is secured to the panels 30, 32 by insertion under the knobs 31 and 33. The knobs 31 and 33 are simply loosened and the strip 76, appropriately indexed, is inserted in place, with a portion of the strip disposed between the panels and the knobs. The knobs are then tightened to secure the strip 76 in place.

By lifting panels 30, 32 and panels 50, 52, photograhic material or paper of the desired size of five-by-seven is exposed. Similarly, the use of another strip 78, secured to panels 34, 36 and overlapping the center juncture with the opposite panels 54, 56 provides a second five-by-seven area.

FIG. 2 comprises an end view of the photographic easel 10 shown in FIG. 1. The base 18 is shown looking toward its rear end 18. A pair of legs or supports 26 is shown secured to the bottom of the base 12. Preferably, four legs 26 are secured to the base 12, with one leg disposed adjacent each of the four corners of the base. A sheet of photographic paper 2 is shown positioned on the top 14 of the base 12. Panel 36 is shown raised partially away from the paper 2, which underlies the panel. The panel 36 is pivoting on its hinge 40. On the left hand portion of FIG. 2, panel 56 is shown in its closed position, but it is also shown in phantom in its open position.

It will be noted that the double hinges 38 and 44 are secured respectively to the panels, such as panel 36, to the spacer 43, and to the base 12. The plate or spacer 43 between the hinges 38 and 44 is not secured to the base directly. Rather, it may pivot on the hinge 44, if desired, to provide for the total removal of the panels 30 . . . 36 and the plate or spacer 43 away from the top 14 of the base 18. In a similar manner the panels 50 . . . 56 pivot with the plate or spacer 62 away from the top 14 of the base 12. This allows substantially unrestricted use of the entire top of the easel.

Photographic paper typically comes in a sheet eight inches by ten inches (20 cm by 25 cm), which sheet normally fits beneath the panels 30 . . . 36 and 50 . . . 56. However, if a larger sheet is desired, the full width of the easel may be used by pivoting the panels and the spacers between the hinges rather than merely pivoting the panels.

Referring again to FIG. 1, it is noted, and has been discussed above, that the panels may be pivoted singly to expose any particular portion of a sheet of paper beneath the particular panel which is pivoted or opened. For example, if a photographer desires to expose only a portion of paper underlying a single panel, the photographic paper is first placed on top 14 of the easel and the panels are then closed to protect the paper from exposure. The easel is then placed beneath an enlarger with all panels remaining closed during the orientation and focusing procedure, using focusing plane 16. If it is desired to first expose the paper beneath the panel 50, the easel 10 is placed beneath an enlarger until the appropriate focusing has been accomplished and the orientation has been accomplished with respect to panel 50. Obviously, there will be some light required during the focusing and positioning procedures. Upon completion of the positioning and focusing procedures, the light will be turned off. Preferably the knobs 31 . . . 37 and 51 . . . 57 are luminous to some extent to allow the user to locate the knobs in the dark in order to easily raise the proper panel without fumbling, and without moving the easel relative to the enlarger after positioning. Accordingly, the knob 51 is grasped to pivot the panel 50 away from the photographic paper 2 and the paper is then exposed. At the conclusion of the exposure, the panel 50 is again placed in its down or closed position and the easel 10 is again positioned beneath the enlarger for the exposure of the paper beneath the panel 52. The procedure is then repeated with respect to the paper beneath the panel 52.

If it is desired that a larger area of the paper 2 be exposed, it may be preferable to secure together two or more adjacent panels, such as panels 54 and 56, shown in phantom in FIG. 1 in their open position. The panels are appropriately secured together, as shown in FIGS. 3, 4, and 5.

FIG. 3 is a view in partial section of a portion of the apparatus of FIG. 1 through panels 54 and 56, taken generally along line 3—3 of FIG. 1. FIG. 4 is an enlarged view of a portion of FIG. 1, comprising the adjacent panels 54 and 56, with a portion of the panels broken away. FIG. 5 is an enlarged fragmentary view of a portion of panel 54. All three Figures will be referred to in the following discussion.

The adjacent sides of the panels, which may be referred to as the interior sides, or those sides of each panel which are next to another panel, include slots, such as slot 70 in panel 54, as shown best in FIG. 5. The slot 70 in panel 54 is also shown in FIG. 3, along with slot 72 in panel 56. The slots 70 and 72 are aligned parallel to and facing each other. The slots 70 and 72 receive a strip 74, which is a relatively rigid strip. The strip 74 serves two primary functions. The first function is the joining or securing together of the adjacent panels 54 and 56, and the second function is that of protecting the seam juncture or space between the panels 54 and 56 from being exposed during the position and focusing procedures.

If only an area the size of a single panel is being exposed at one time, the minute space or crack between panels is immaterial with respect to its exposure during the positioning and focusing process because such exposed portion will be on an edge of a picture which will be cut or separated after printing. However, if an area of film the size of two panels, or three, or four or more panels, is to be exposed, obviously the film beneath the junctures of adjacent panels must be protected from exposure. This is accomplished by use of strips, such as strips 74, which are inserted into aligned slots in adjacent panels.

If it is desired to use the easel apparatus 10 when exposing more than an area beneath a single panel, then strips, such as strip 74, are inserted into the appropriate slots between panels 30 and 32, 34 and 36, 50 and 52, and 54 and 56. This allows the panels 30 . . . 36 and 50 . . . 56 to act as single panels and will fully protect the crack or seams between the adjacent panels when making four pictures, each three and one-half by five, from a single sheet of paper. For the longitudinal extending slot juncture between the right side panels (30 . . . 36) and the left side panels (50 . . . 56), the protective strips 76 and 78 may be placed on the longitudinal seam or juncture after the film or paper has been placed on the easel. This allows two pictures, each five-by-seven, to be made from a single sheet of paper.

A pin 80 is shown in FIGS. 1, 2, 6, and 7, disposed about centrally of the base 12, from left to right, and at the front edge or side 24, as shown in FIG. 6. The pin 80 serves as a forward limit or stop for paper inserted onto the top 14 of the easel apparatus 10. This junction may be readily understood from FIGS. 1 and 2. In addition, the pin 80 serves as a cam for moving the paper out of the apparatus after the paper has been exposed, thus alleviating the necessity of having the user of the apparatus touch the exposed paper with his hands. This is accomplished as best shown in FIGS. 6 and 7.

FIG. 6 is an enlarged view of a portion of the apparatus of FIG. 1, with a portion of the top 14 removed to illustrate the functioning of the pin 80 and its associated structural elements. FIG. 7 is a view in partial section of the apparatus of FIG. 6 taken generally along line 7—7 of FIG. 6. Reference will be made primarily to FIGS. 6 and 7 in discussing the pin 80 and its functioning.

The pin 80 is secured to a strap 90 which is in turn pivotally secured to a pin 92. The strap 90 is disposed beneath the top 14 of the base 12, and it may be secured to the underneath or bottom side of the base 12, or it may be disposed in a relieved portion of the base 12 adjacent the front edge or side 24. A curved slot 28 extends from the front edge 24 rearwardly through the base 12, and the pin 80 extends through the slot 28 upwardly to terminate slightly above the top 14 of the base 12. The slot 18 comprises an arc whose center is at the pivot pin 92 to allow the unrestricted movement of the pin 80 as the pin is moved to cause movement of the strap 90.

The strap 90 is biased to the position shown in FIG. 6 by a spring 94 which is anchored at one end to a pin 96. The pin 96 is in turn secured to the base 12. The spring 94 extends from the pin 96, around the pin 92, and is secured to the strap 90, as illustrated in FIG. 6. The outer limit of movement of the strap 90, as biased by the spring 94, maintains the pin 80 at the front edge 24 of the base 12. The outer edge 24 of the base 12 provides a convenient stop for the strap 90 to limit the outward movement of the pin 80 and thus to define its position at the front edge 24 of the base 12. As shown most clearly in FIG. 7, the pin 80 includes an offset portion which extends from the strap 90 outwardly to the edge 24 when the pin 80 and the strap 90 are in the outermost, or the rest, position.

When a sheet of paper is disposed on the top 14, the pin 80 thus limits its outermost position or orientation with respect to the base 12. When it is desired to remove the sheet of film or paper, the user simply moves the pin 80 in the slot 28, which causes the paper to be cammed rearwardly on the top 14. As shown in FIG. 6, while the slot 28 is an arcuate or curved slot, it is generally along the longitudinal axis, or lengthwise, with respect to the base 12 and the photographic easel 10. This results in a rearward movement of the sheet of film or paper which is disposed against the pin 80.

The length of the offset portion 82 of the pin 80 corresponds to the distance between the edge 24 of the base 12 and the specific location on the strap 90 at which the pin 80 is secured. This distance will generally be slightly greater than half the width of the strap 90, depending on where the pin 80 is secured to the strap. Obviously, the length and specific location of the slot 28 is correlated with the strap 90 with respect to its pivot point on the pin 92. It is preferable to have the pin 80, and thus the slot 28, centrally disposed with respect to the sides 20 and 22 of the apparatus 10.

In addition to the pin 80 comprising a forward stop for the paper on the top 14, the front edge 24, as best shown in FIG. 6, may comprise a separate blade or tab which extends above the top 14 to comprise a paper stop. The pin 80 is appropriately aligned with the tab 24, or slightly beyond the tab, so as not to interfere with the paper disposed against the tab.

FIG. 8 comprises an enlarged view in partial section through a corner of the apparatus of FIG. 2, illustrating details of the hinges, and also illustrating retractable pins which may be used to align paper 2 on the top 14 of the easel apparatus 10.

It will be noted that the door or panel 36 is slightly thinner than is the spacer 43. The difference in thickness is to compensate for the thickness of a sheet of paper 2 disposed beneath the panel.

The spacer 43 includes a relieved portion 143 adjacent the panel 36 for receiving part of the sheet 2 of photographic paper. An inner edge 144 of the relieved portion 143 comprises an outer or outside wall for the sheet of paper. If the door 36 is lifted or pivoted on hinge 38, the side edge of a sheet of photographic material extends into the relieved portion or recess 143 to align the material and thus keep the paper or material in place and prevent it from inadvertent movement. A similar relieved portion or recess is also found on the opposite side of the easel in or under the spacer 62.

If both the door 36 and the spacer or plate 43 are pivoted on hinge 44, a pair of alignment or guide pins 110 and 120 is used for alignment. Actually, there is preferably at least a pair of such guide pins on each side of the easel 10 beneath the plates or spacers 43 and 62. It will be noted that the pin 110 is aligned with the edge 144 of the recess 143.

The pin 110 is disposed in a small bore 102 which extends upwardly through the base 12. A smaller bore 106 extends upwardly from bore 102 to the top 14 of the base 12. A shoulder 104 is defined between the coaxially aligned bores. The pin 110 extends upwardly through the bore 106.

The pin 110 includes a radially outwardly extending portion 112 which is disposed in the bore 102 and which contacts shoulder 104 to limit the upward movement of the pin 110. The pin is biased upwardly by a compression spring 116.

The pin 110 moves downwardly into the bores 102 and 106 when the plate 43 is in its down position, on the top 14 of the base 12. When the plate 43 pivots away from the base 12 on the hinge 44, the pin 110 moves upwardly above the surface 14 and becomes a guide pin for aligning photographic paper. The pin 110 and spring 116 are on a cup 118 which is pressed into the bore 102. The bottom of the cup comprises the base or floor for the spring 116.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Photographic easel apparatus for holding photographic paper, comprising, in combination:
   base means, including
      a planar top, including a first portion for holding photographic paper and a second portion adjacent the first portion comprising a focusing plane,
      a first side and a second side adjacent the top,
   panel means, including a plurality of panels on the first portion of the top individually movable from a closed position covering photographic paper disposed on the first portion of the top to an open position exposing the photographic paper disposed on the first portion of the top; and
   means for aligning the photographic paper on the first portion of the top of the base means.

2. The apparatus of claim 1 in which the panel means includes means for selectively securing together adjacent panels for joint movement.

3. The apparatus of claim 2 in which the means for selectively securing together adjacent panels includes a protective strip secured to a pair of adjacent panels and overlying a pair of opposite panels.

4. The apparatus of claim 2 in which the panel means includes a pair of adjacent panels and a pair of opposite panels, and each panel includes interior sides of the panels adjacent each other, and the interior sides include slots parallel to each other, and a strip is disposed in the slots of the interior sides for securing adjacent panels together and for protecting the paper beneath the interior sides of the panels.

5. The apparatus of claim 1 in which the panel means includes hinge means for pivotally securing the panels of the panel means to the base means.

6. The apparatus of claim 5 in which the panel means further includes a first plurality of panels adjacent the first side of the base means and a second plurality of panels adjacent the second side of the base means.

7. The apparatus of claim 6 in which the hinge means includes
   a first hinge secured to the first plurality of panels, and
   a second hinge secured to the second plurality of panels for pivoting the panels of the first plurality of panels independently of the panels of the second plurality of panels.

8. The apparatus of claim 7 in which the hinge means further includes spacer means, comprising
   a first spacer secured to the first hinge, and
   a second spacer secured to the second hinge.

9. The apparatus of claim 8 in which the means for aligning the photographic paper includes a recess in the first and second spacers.

10. The apparatus of claim 8 in which the hinge means further includes
    a third hinge secured to the first spacer and to the base means, and
    a fourth hinge secured to the second spacer and to the base means, for pivoting the first and second plurality of panels and the first and second spacers of the spacer means independently of each other.

11. The apparatus of claim 9 in which the means for aligning the photographic paper comprises pins disposed in the base means and movable in the base means in response to the pivoting of the spacer means.

12. The apparatus of claim 1 in which the base means further includes pin means disposed at the first portion of the top remote from the second portion and comprising a stop for the photographic paper for moving the photographic paper from the top.

13. The apparatus of claim 12 in which the base means further includes a front edge between the first side and the second side, and the means for moving the photographic paper comprises a pin disposed adjacent the front edge extending upwardly from the top and movable along the top between the first and second sides for moving photographic paper from the top.

* * * * *